Dec. 31, 1940.   J. R. HENDERSON   2,227,222
PLANT SPRAYING APPARATUS
Filed Dec. 1, 1939   2 Sheets-Sheet 1

Inventor
J. Roy Henderson

By *Clarence A. O'Brien*
and *Hyman Berman*
Attorneys

Dec. 31, 1940. J. R. HENDERSON 2,227,222
PLANT SPRAYING APPARATUS
Filed Dec. 1, 1939 2 Sheets-Sheet 2
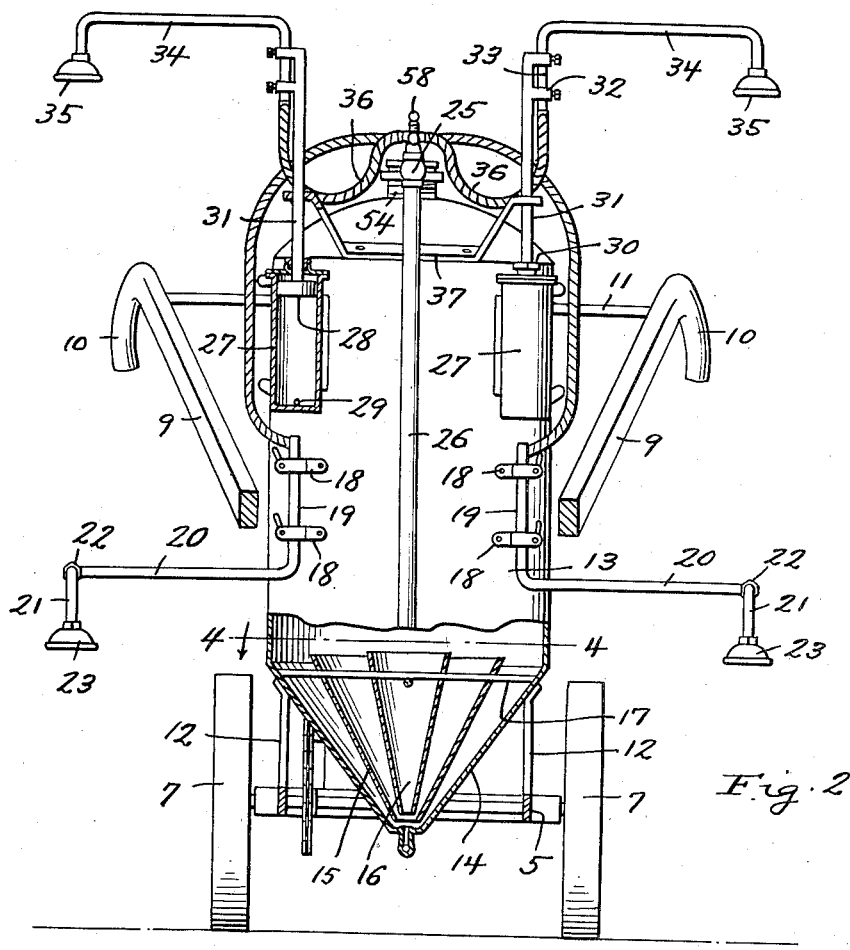
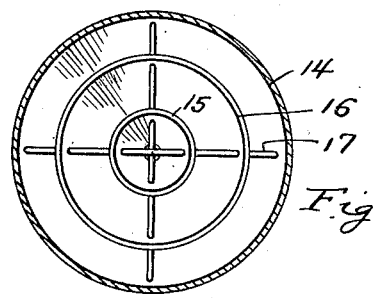
Inventor
J. Roy Henderson
By Clarence A. O'Brien
and Hyman Berman
Attorneys Patented Dec. 31, 1940

2,227,222

UNITED STATES PATENT OFFICE 2,227,222

PLANT SPRAYING APPARATUS

James Roy Henderson, Nashville, Ga.

Application December 1, 1939, Serial No. 307,158

3 Claims. (Cl. 299—40)

This invention appertains to new and useful improvements in apparatus for spraying plants such as tobacco and other growing crops.

The principal object of the present invention is to provide a plant spraying apparatus wherein the spraying material is constantly mixed as the apparatus is being used.

Another important object of the invention is to provide a spraying apparatus which involves adjustable nozzles which can be readily adjusted to accommodate plants over different ranges of growth.

Still another important object of the invention is to provide a spraying apparatus which employs air under pressure to mix the spray material and wherein the air under pressure can also be used to adjust the nozzles of the spray apparatus.

These and various other important objects and advantages of the invention will become apparent to the reader of the following specification.

In the drawings:

Figure 2 is a front elevational view of the machine with a portion broken away.

Figure 4 is a section on the line 4—4 of Figure 2.

Figure 1:
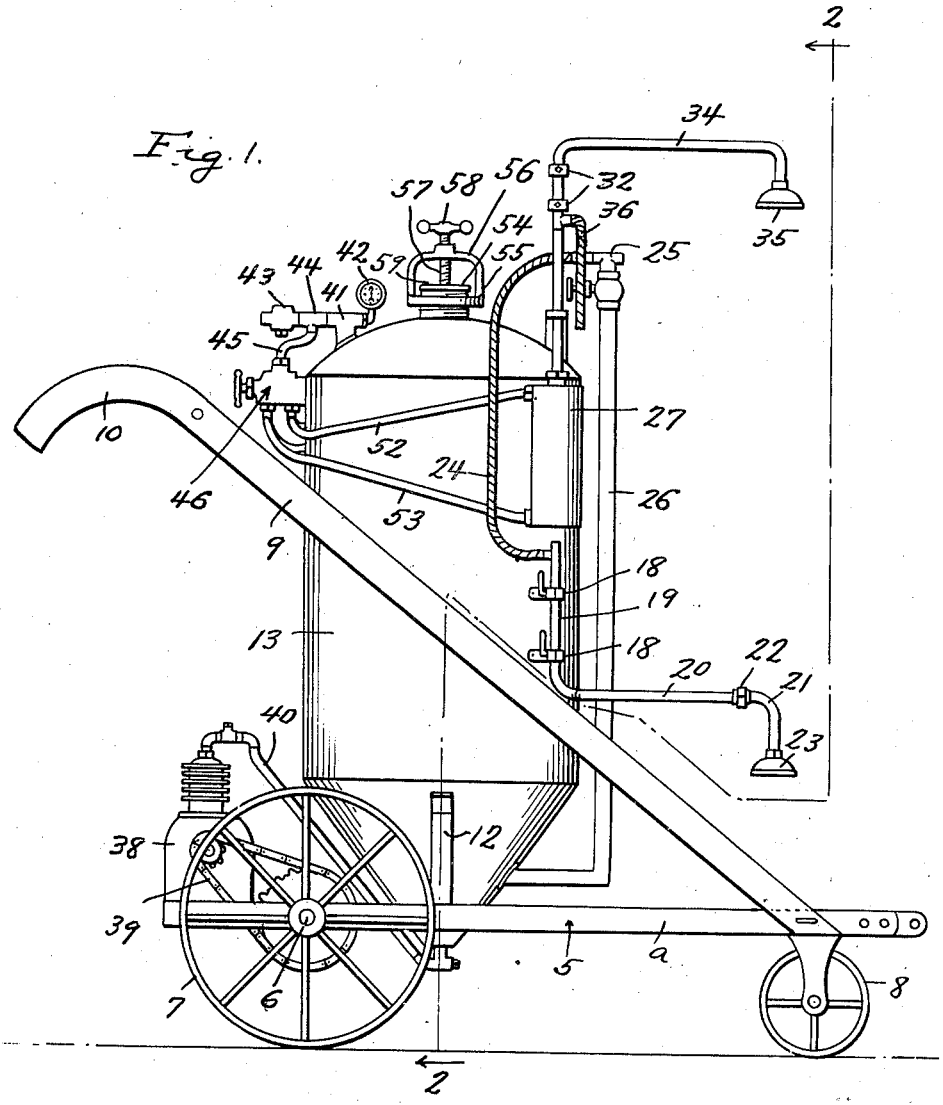
Figure 1 represents a side elevational view of the machine.
Figure 3:
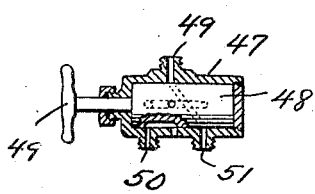
Figure 3 is a sectional view through the distributing valve.

Referring to the drawings wherein like numerals designate like parts, it can be seen that numeral 5 generally refers to a platform which includes the side members a. This frame supports the axle 6 at the rear portion thereof and at the ends of this axle 6 are the wheels 7, these wheels being keyed to the axle. At the forward portion of the frame 5 is the wheel 8. Extending inclinedly from the forward portion of the frame 5 are the rearwardly diverged hand bars 9—9 terminating at their rear ends in handles 10. Suitable brace means 11 is provided between the handles 10.

Supported by uprights 12 on the frame 5 is the tank 13 which has the inverted conical-shaped bottom 14. Disposed in the inverted conical-shaped bottom 14 are inverted frustro-conical-shaped shells 15 and 16, open at their lower ends and in spaced relation to each other throughout their lengths. These shells 15 and 16 are supported by crossed rods 17 extending through the upper portions thereof and attached at their ends to the upper portion of the inverted conical-shaped bottom 14. A pair of clamp members 18—18 is provided at each side of the forward part of the tank 13 for accommodating the vertical portions 19 of the spray nozzle carrying arms 20. Extensions 21 swivelly connected as at 22 to the arms 20 have the spray nozzles 23 carried at their outer ends. Flexible conduits 24 extend downwardly to the hollow arms 20 from the distributing head 25 at the upper end of the pipe 26 which extends from the bottom 14 of the tank 13.

On the forward portion of the tank 13 are the air cylinders 27—27 in which the pistons 28 are operative. The cylinders 27 have air inlets 29 at their upper and lower ends.

Extending upwardly from the cylinders 28 and through packing glands 30 in the upper ends of the cylinders 27 are the rods 31 which have clamp means 32 at their upper ends through which the depending portions 33 of the upper spray arms 34 extend. These upper spray arms 34 carry the spray nozzles 35. Conduits 36 of flexible construction extend from the aforementioned distributing head 25 to the hollow spray arms 34. A brace strap 37 is secured to the top portion of the tank 13 and has arm extensions serving as guides for the said rods 31.

On the rear of the frame 5 is the compressor 38 driven by a chain drive 39 from the axle 6. The air line 40 from the compressor 38 extends to communicate with the tank 13 at the bottom thereof. Numeral 41 represents an outlet fitting at the top of the tank 13 for air and on this fitting is the air pressure gauge 42. Numeral 43 represents a relief valve and between the relief valve 43 and the fitting 41 is the T-fitting 44 from which the conduit 45 extends to the distributing valve 46 which consists of the shell 47 in which is the rotor 48 operated by the hand wheel 49. The rotor 48 has ports therethrough for communicating the inlet duct 49 with either the outlet duct 50 or 51. From the outlet duct 51 conduits 52 extend to the upper inlets of the cylinders 27, while from the nipples 50 conduits 53 extend to the lower inlets of the cylinders 27. Thus it can be seen that by controlling the valve 46 the pistons 28 in the cylinders can be raised or lowered to the desired degree to accommodate plants of various ranges of growth.

The top of the tank 13 has a neck 54 on which is the collar 55 and rising from the collar 55 is the frame 56 through which the screw 57 is feedable by means of a hand wheel or the like 58. This screw 57 is adapted to be screwed against the cap 59 which bears against the upper end of the neck 54.

Obviously, the baffles 15 and 16 serve to break up the mix while the air entering through the bottom of the tank continuously activates the same so that it is thoroughly mixed at all times.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A spray apparatus comprising a tank, cylinders mounted on the tank, pistons operative in the cylinders, rods extending from the pistons, spray nozzles, conduits carrying these spray nozzles, connections between the conduits and the rods, said conduits being in communication with the tank, means for mixing spray material in the tank, said cylinders having inlets at the upper and lower ends thereof, a compressed air supply line and distributing means between the line and the upper and lower inlets of the said cylinders.

2. A spray apparatus comprising a tank, cylinders mounted on the tank, pistons operative in the cylinders, rods extending from the pistons, spray nozzles, conduits carrying these spray nozzles, connections between the conduits and the rods, said conduits being in communication with the tank, means for mixing spray material in the tank, said cylinders having inlets at the upper and lower ends thereof, a compressed air supply line and distributing means between the line and the upper and lower inlets of the said cylinders, said cylinders and spray nozzles being at the upper portion of the tank, and additional spray nozzles adjustably mounted at the lower portion of the tank.

3. In a spraying apparatus, a source of spray liquid, a fluid pressure cylinder, a piston operative in the cylinder, a fluid pressure supply to the cylinder, a rod extending from the piston, a conduit from the spray liquid source, a spray head, an arm extending from the spray head and having a leg portion, said arm being hollow and having the conduit connected to the leg portion thereof, and clamp means on the outer end of the rod for clamping the leg portion to the said rod.

JAMES ROY HENDERSON.